United States Patent
Foster

[15] 3,659,910
[45] May 2, 1972

[54] RETAINER FOR SPHERICAL ADAPTER
[72] Inventor: David A. Foster, Sandusky, Ohio
[73] Assignee: General Motors Corporation, Detroit, Mich.
[22] Filed: May 6, 1970
[21] Appl. No.: 35,167

[52] U.S. Cl.............................................308/9, 308/72
[51] Int. Cl. .................................F16c 17/16, F16c 23/04
[58] Field of Search ..............................308/121, 122, 72, 9

[56] References Cited
UNITED STATES PATENTS
3,360,309  12/1967  Voorhies ..................................308/9

*Primary Examiner*—Martin P. Schwadron
*Assistant Examiner*—Frank Susko
*Attorney*—Jean L. Carpenter and F. J. Fodale

[57] ABSTRACT

A self-aligning externally pressurized fluid film bearing is provided with a relatively deep grooved self-aligning seat. Critical dimensioning of portions of the seating groove and its cooperating partispherical bearing surface provide a means to insure centering of the bearing surface on the seat after assembly in order to provide adequate sealing of a fluid passage through the self-aligning elements, smooth self-alignment and resilient mounting of the fluid film bearing.

1 Claims, 2 Drawing Figures

Patented May 2, 1972 3,659,910

INVENTOR.
David A. Foster
BY
F. J. Fodale
ATTORNEY

RETAINER FOR SPHERICAL ADAPTER

My invention relates generally to externally pressurized fluid film bearings and more specifically to self-aligning externally pressurized fluid film bearings.

In the U. S. Pat. to Voorhies, No. 3,360,309 issued on Dec. 26, 1967, there is disclosed a self-aligning externally pressurized fluid film bearing in which an adapter shell has a partispherical surface mounted on a pair of spaced resilient O-rings which not only form the self-aligning seat for the adapter but also provide a sealed passage between the support and the adapter. Because of the dual function, centering of the partispherical surface on the O-rings is important because the O-rings must be sufficiently biased into the partispherical surface to form a good seal yet not be so tight as to prevent self-aligning adjustment of the bearing sleeve carried by the adapter with respect to the rotatable shaft. It is generally the object of my invention to improve upon the Voorhies structure by incorporating means to provide such alignment after assembly of the bearing in a simple and efficient manner.

Another object of my invention is to provide a self-aligning externally pressurized fluid film bearing having a "ball" (partispherical surface) and socket (spaced O-rings) in which alignment of the "ball" member of the bearing on the spaced O-ring "socket" member of the bearing is insured by a simple rocking of the "ball" member into abutment with the O-ring "socket" member.

Another object of my invention is to provide such a bearing in which the "ball" is deeply seated in the "socket" so that the integrity of the assembled bearing is insured during handling prior to assembly in a more comprehensive assembly.

Another object of my invention is to provide a self-aligning externally pressurized fluid film bearing in which an adequately sealed fluid passage is provided between and through the "ball" and "socket" members under all conditions of tilt.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
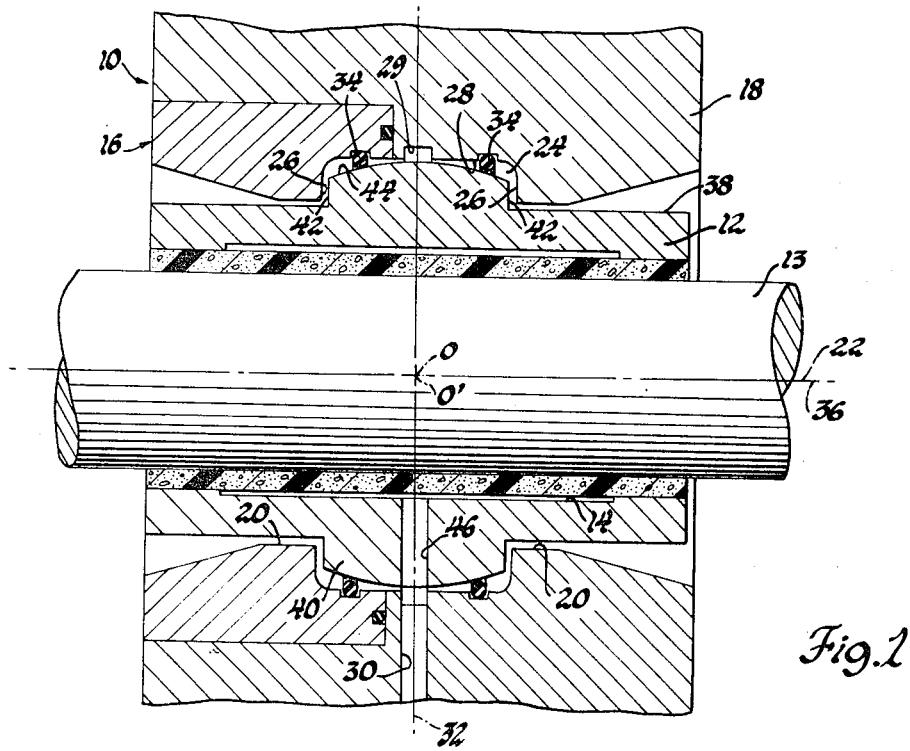
FIG. 1 is a longitudinal section taken through a self-aligning externally pressurized fluid film bearing according to my invention and shows the self-aligning elements aligned longitudinally.

Referring now to FIG. 1, a housing or support 10 provides a seat for an adapter 12 which in turn provides a self-aligning mount for an externally pressurized fluid film bearing which rotatably supports a shaft 13. The fluid film bearing disclosed is of the permeable sleeve type and utilizes a compressible fluid, such as air. Such bearings are well-known and for a further detailed description, recourse may be made to the U. S. Pat. to Voorhies, No. 3,360,309, the disclosure of which is incorporated herein by reference. As is evident from the aforementioned patent, fluid under pressure must be supplied to the plenum 14 from an external pump (not shown) through the housing 10 and adapter 12. My invention concerns itself with providing a fluid passage between these two relatively rockable members. To this end, the housing 10 comprises two discrete pieces 16 and 18 which when assembled together form a circumferential surface 20 centered from the longitudinal axis 22 of the housing 10. The outboard ends of the pieces 16 and 18 are bell-mouthed limiting the circumferential surface 20 to a critical relationship with other parts of the bearings as will hereinafter be more fully explained.

A recess 24 formed by the two pieces 16 and 18 opens into the circumferential surface 20. The recess 24 has parallel radial walls 26 contiguous with a bottom wall 28 which spans both pieces 16 and 18. A radial passage 30 in the piece 18 leads from an external pressure source, such as a pump (not shown), and opens into the bottom wall 28 through a circumferential groove 29. The axis 32 of the passage 30 intersects the axis 22 at an imaginary point 0.

Elastomeric O-rings 34 are mounted in shallow circumferential grooves in the pieces 16 and 18, respectively, on each side of the radial passage 30.

Figure 2:
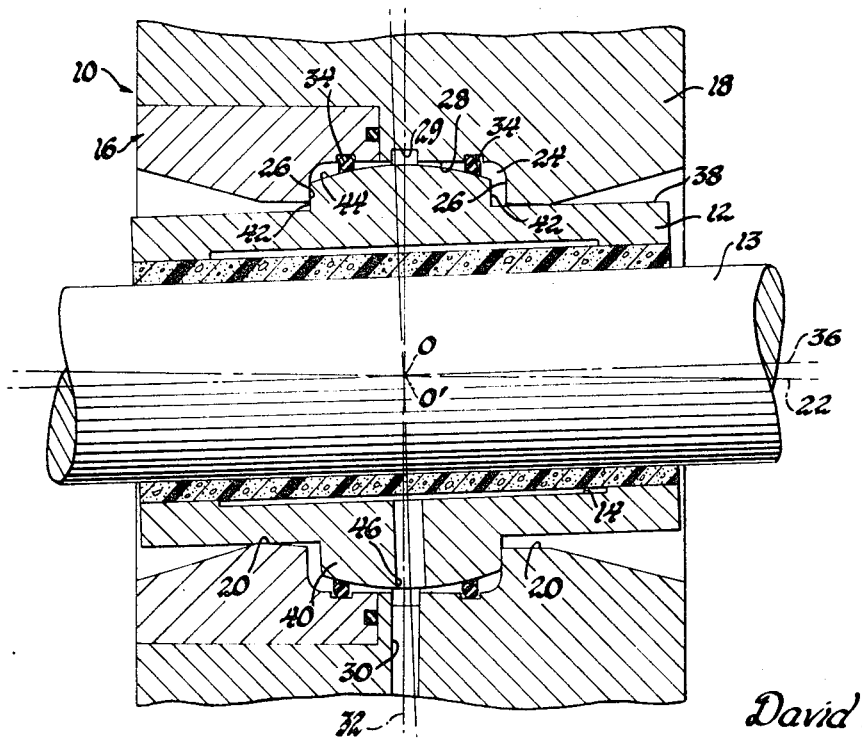
FIG. 2 is a view similar to FIG. 1 but showing one of the self-aligning elements tilted to an extreme position with respect to the other self-aligning element.

The adapter 12 includes a cylindrical surface of revolution about its longitudinal axis 36 which coincides with axis 22 in FIG. 1 and is tilted with respect to it in FIG. 2. The cylindrical surface is identified by the numeral 38. The adapter includes an annular boss 40 having parallel side walls 42 contiguous with a partispherical surface 44. A second radial passage 46 extends through the adapter 12 from the plenum 14 to the partispherical surface 44. The axis of passage 46 intersects the axis 36 at an imaginary point 0'. With the adapter 12 aligned with and centered on the housing 10 as shown in FIG. 1, radial passage 46 aligns with radial passage 30 and thus the points 0 and 0' coincide. It is to be noted that surface 44 is spaced a small amount from surface 28 so that the O-rings provide a resilient support to inhibit half-speed whirl. It is also to be noted that the O-rings 34 are placed so they contact surface 44 in all tilt positions and at no time interfere with the passage 46. It is the object of my invention to insure that the imaginary points 0 and 0' always substantially coincide at all angles of tilt so that the O-rings 34 sealingly engage the surface 44, provide a self-aligning seal for it and provide a resilient mount for the adapter under all angles of tilt.

To insure substantial coincidence, the spacing between side walls 42 and radial walls 26 is critical in relation to the spacing between the circumferential surface 20 and the cylindrical surface 38. The parts are centered in FIG. 1 and it is to be noted that partispherical surface 44 on the annular boss 40 is centered from coinciding imaginary points 0 and 0'. Therefore, tilt of the adapter 12 is about these coinciding imaginary points. Thus by proper dimensioning, the cylindrical surface can be made to abut the circumferential surface 20 at two points simultaneously with the side walls 42 abutting the radial walls 26 when the adapter is tilted to an extreme position, such as shown in FIG. 2. If this critical dimensioning is designed into the housing and adapter, then it necessarily follows that when the four above-mentioned contacts are made to occur simultaneously, the points 0 and 0' must necessarily coincide. Thus the adapter 12 is centered on the O-rings and the passages 30 and 46 and circumferential groove 29 are aligned in the same plane simply by rocking the adapter to the extreme position where four point contact is made. The adapter 12 may then be backed off to the aligned position of FIG. 1. With the adapter centered, an adequate self-alignment mount for all self-alignment positions encountered by the bearing during its operation is provided along with a fluid-tight passage from the housing 10 to the adapter 12.

I wish it to be understood that I do not desire to be limited to the exact details of construction shown and described, for obvious modifications will occur to a person skilled in the art.

I claim:

1. In a self-aligning externally pressurized fluid film bearing, the combination comprising, a multipiece support having a longitudinal axis and a circumferential surface parallel to its longitudinal axis, an annular recess in said support opening into said circumferential surface, said recess having a circumferential wall and spaced radial walls, said recess being formed by at least two pieces with said radial walls being on separate pieces and said circumferential wall extending over at least two pieces, a passage in said support opening into the circumferential wall of said recess, said passage having an axis perpendicular to said longitudinal axis and intersecting it at an imaginary point, an elastomeric O-ring mounted on said circumferential wall on each side of said passage and mounted on separate pieces of said support, an adapter having a second longitudinal axis and having a cylindrical surface of revolution about its longitudinal axis, said cylindrical surface being of different diameter than said circumferential surface of said support, an annular boss on said adapter protruding from said cylindrical surface and extending into said recess, said boss having radial walls spaced apart in the axial direction less than the axial spacing between the radial walls of said recess, a partispherical surface on said boss sealingly engaging said elastomeric O-rings, a radial passage in said adapter opening into said partispherical surface and having an axis intersecting a second imaginary point on said second longitudinal axis, said partispherical surface being generated from said second imaginary point, and the difference in diameter between said cylindrical surface and said circumferential surface and the difference in axial dimension between the radial walls of said recess and the radial walls of said boss being such that said cylindrical surface engages said circumferential surface substantially simultaneously with the engagement of said radial walls of said recess by the radial walls of said boss when said adapter is tilted with respect to said support whereby substantial coincidence between said first and said second imaginary points is provided by tilting said adapter into abutment with said support whereby an adequate fluid passage is provided between said support and said adapter under all conditions of self-alignment.

* * * * *